United States Patent [19]

Carlson et al.

[11] Patent Number: 5,206,992
[45] Date of Patent: May 4, 1993

[54] COMPRESSIBLE ROLLER

[75] Inventors: James R. Carlson, Franksville, Wis.; Gerald J. Landl, Antioch, Ill.

[73] Assignee: American Roller Company, Union Grove, Wis.

[21] Appl. No.: 897,681

[22] Filed: Jun. 12, 1992

[51] Int. Cl.[5] .......................... B21K 1/02; B21H 1/14
[52] U.S. Cl. ............................ 29/895.32; 29/895.21; 29/895.3; 101/376; 492/56
[58] Field of Search ............... 101/148, 376, 493, 483; 29/895.32, 895.3, 895.211, 895.212, 130, 132

[56] References Cited

U.S. PATENT DOCUMENTS

| | | | |
|---|---|---|---|
| 2,326,777 | 8/1943 | Guth | 29/895.32 X |
| 3,147,698 | 9/1964 | Ross | 101/149.2 |
| 3,368,482 | 2/1968 | Lusher et al. | 29/132 X |
| 3,467,009 | 9/1969 | Ross | 101/216 |
| 3,475,803 | 11/1969 | Hill | 29/132 |
| 3,622,412 | 11/1971 | Ross | 29/132 X |
| 3,686,731 | 8/1972 | Koori et al. | 29/132 |
| 3,707,752 | 1/1973 | Brafford et al. | 29/132 |
| 4,309,803 | 1/1982 | Blaszak | 29/132 X |
| 4,313,981 | 2/1982 | Namiki | 427/409 |
| 4,359,938 | 11/1982 | Koren | 101/148 |
| 4,378,622 | 4/1983 | Pinkston | 29/148 |
| 4,827,868 | 5/1989 | Tarumi et al. | 29/132 X |
| 5,099,560 | 3/1992 | Kato et al. | 29/132 X |
| 5,142,760 | 9/1992 | Bell | 29/132 X |

Primary Examiner—Timothy V. Eley
Assistant Examiner—C. Richard Martin
Attorney, Agent, or Firm—Quarles & Brady

[57] ABSTRACT

A compressible roller especially useful in high speed printing systems consists of a rigid core and a compressible cover. The cover consists of a first relatively thick layer of compressible foam which is bonded to the core, an elastomeric seal bonded to the foam; and an outer print layer of a compatible elastomer bonded to the seal. A method of preparing the roller also is disclosed.

4 Claims, 1 Drawing Sheet

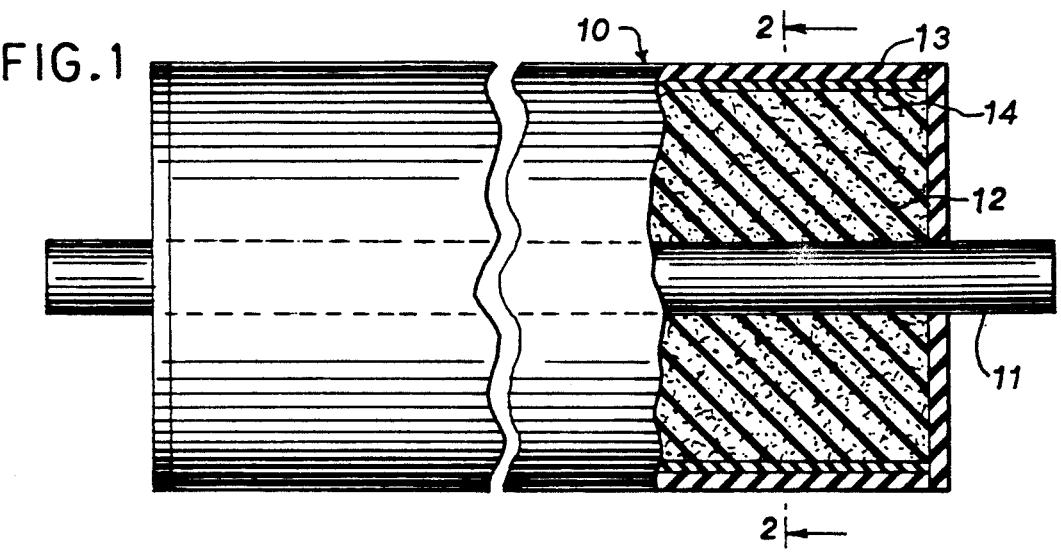
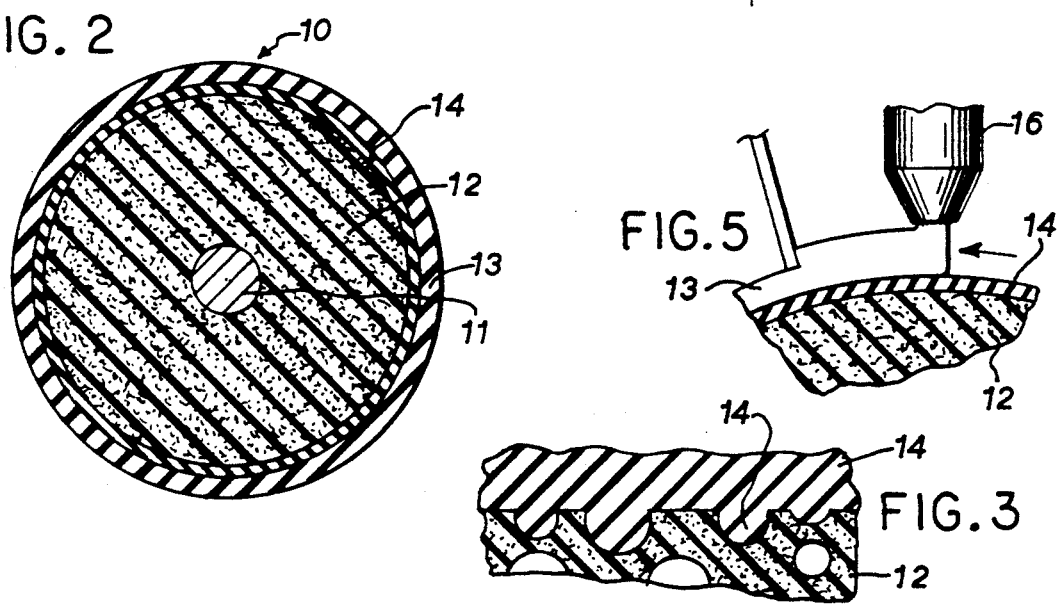
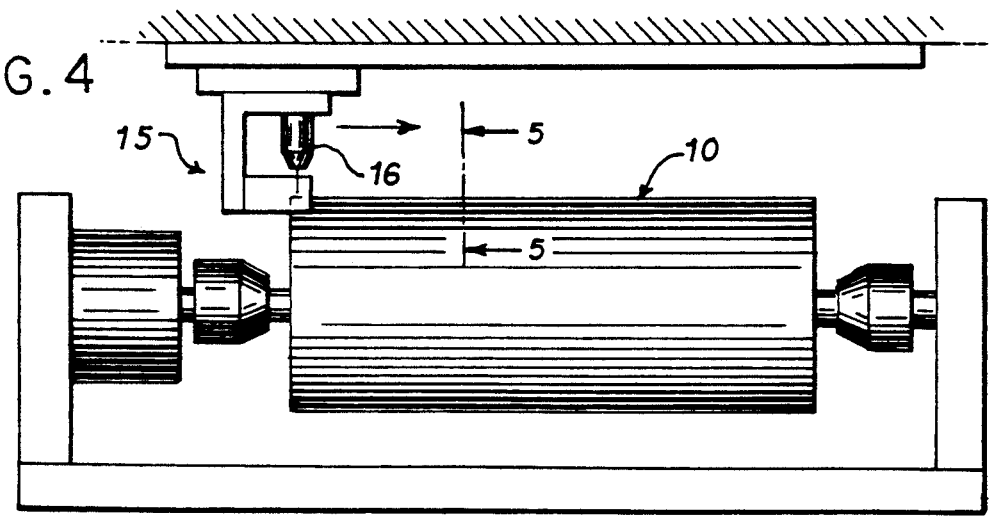

COMPRESSIBLE ROLLER

FIELD OF THE INVENTION

The present invention relates to a novel roller. More particularly, it relates to a novel compressible roller useful in the printing industry.

BACKGROUND OF THE INVENTION

The rollers generally in use in the printing industry today are metal roller cores covered with either a solid rubber or a solid plastic cover of varying degrees of hardness.

The solid rubber or plastic covered rollers are elastic but they are not compressible. As a result, when pressures are applied to such rollers, the rubber or plastic moves away from the point of application of pressure in several directions causing distortions or deformation of the rollers without substantially changing their volume.

In most printing operations, a printing roller is used in conjunction with another roller, generally a steel roller. When pressure is exerted on a printing roller with a solid rubber or solid plastic cover by a steel roller, the incompressibility of the cover results in ripples or bulges being formed at the nip and a change in the circumference of the printing roller. In addition to distorting the image being printed, this change in circumference can result in changes of the velocity of the printing roller resulting in heat buildup that can cause the premature destruction of the printing roller, the generation of static electricity and other undesirable effects.

In the Ross U.S. Pat. No. 3,467,009, the various disadvantages of non-compressible solid rubber or plastic covered printing rollers and the advantages of having a compressible printing roller are described. The Ross patent's answer to the need for a compressible printing roller is a metal roller core with a cover having at least three distinct layers of different materials. The first innermost layer of the cover is a layer of highly flexible sponge rubber which covers the metal core. The intermediate layer(s) is (are) of a compressible, dimensionally stable material which is disclosed in the patent as being a fibrous web impregnated with rubber. The outermost layer is a thin protective coating of rubber which covers the outer surface of the intermediate layer(s) and provides a printing surface.

Although the Ross patent roller is described for use in the printing industry, it is not known to have been used therein. Perhaps, the reason is that the Ross patent roller has only a limited ability to recover to its original thickness immediately upon release of an applied force and that is not adequate for use in today's high speed printing systems. In addition, when used in high speed printing the Ross roller construction because of its three or more distinct layers of different materials, is likely to generate excessive internal heat which can cause the premature destruction of the roller.

In the Pinkston et al U.S. Pat. No. 4,378,622, a compressible printing roller is described which consists of a rigid core, a tubular inner layer of microporous, open celled rubber material and a tubular cover disposed about the inner layer. The cover is made of a non-porous polymeric material which provides a printing surface. The inner and outer layers of the Pinkston et al roller are preferably frictionally bound to each other; however, the optional use of an adhesive for that purpose is mentioned. The Pinkston et al roller appears to be relatively difficult to assemble, which probably accounts for it apparently not being used in the printing industry.

Neither the Ross or the Pinkston et al rollers appears to be without serious disadvantages. Therefore, a need still exists for an inexpensive, compressible roller for use in the printing industry.

BRIEF SUMMARY OF THE PRESENT INVENTION

It is an object of the present invention to disclose an inexpensive, compressible roller for use in the printing industry.

It also is an object to disclose a compressible roller having a cover which has the ability to recover to substantially all its original thickness immediately upon the release of an applied force.

Another object is to disclose an inexpensive, practical method of preparing such a compressible roller.

The novel roller of the present invention consists essentially of a rigid core, a first relatively thick layer of compressible foam bonded to said core, an elastomer seal which fills the exposed pores in the outer surface of the foam forming a mechanical bond with the foam layer and preventing gas from escaping therefrom, and an outer layer of a compatible elastomer bonded to the elastomer seal to provide a printing surface.

The method of preparing the novel compressible roller of the present invention comprises applying an adhesive to the outside of the rigid core which is preferably of steel; wrapping a foam layer about the core; wrapping a tape about the core and the foam to compress the foam and insure a good adhesive bond; and curing the adhesive, with heat if necessary, to bond the core and the foam layer together. The tape is then removed and the foam layer is ground to the desired roundness and thickness. Next, the outer surface of the foam layer is covered with a thin coat of liquid elastomer to fill the exposed pores. The elastomer cures to form a seal which is mechanically bonded to the foam layer and prevents any gas contained within the foam from later exiting and causing voids in the material of the outer or print layer. The cured seal elastomer is chemically tacky (i.e., it contains reactive sites which will bond with the outer or print layer elastomer). The outer or print layer is then formed by applying one or more ribbon coatings of an elastomer over the chemically tacky seal while rotating the core until the outer layer is built up to the desired thickness. The outer layer at this stage is of greater thickness than the desired thickness of the final outer layer. The ends of the thus assembled roller are then sealed so that fluid cannot enter the exposed ends of the layers and the roller is cured at room temperature. Finally, the outer layer of roller is ground to the desired thickness to obtain a roller which is round and has a surface of the desired smoothness.

The foregoing and other objects and advantages of the invention will become apparent to those skilled in the art from the description of the preferred embodiment.

BRIEF DESCRIPTION OF THE DRAWINGS

FIG. 1 is an elevational view, partly in section, of a roller of the present invention;

FIG. 2 is a sectional view taken along line 2—2 in FIG. 1;

FIG. 3 is an enlarged view showing the interface of seal and the foam layer;

FIG. 4 is a diagramic view showing the outer layer of the roller of FIG. 1 being formed; and FIG. 5 is a view taken along line 5—5 in FIG. 4.

DESCRIPTION OF THE PREFERRED EMBODIMENT

In the preferred embodiment of the invention as seen in FIGS. 1 and 2, the roller 10 consists of a rigid roller core 11, an intermediate foam layer 12 and an outer or print layer 13.

The preferred roller 10 is made by gluing a layer of foam onto a metal core; wrapping the foam layer 12 with a nylon tape (not shown) to compress the foam, and baking and curing the thus formed assembly. The nylon tape is then removed and the foam layer 12 ground to the desired thickness, roundness and smoothness. Next, a coating of a liquid room temperature vulcanizing (RTV) elastomer is applied over the foam layer 12. The elastomer enters into the exposed pores of the foam to mechanically bond to the foam and forms a seal 14 (seen best in FIG. 3) which prevents any gases from within the foam layer 12 from later leaving and causing voids in the outer or print layer 13. The outer or print layer 13 is then formed by applying multiple ribbon coatings of a compatible liquid room temperature vulcanizing elastomer over the seal 14 until an outer layer is obtained which is thicker than the desired thickness of the final outer layer. The exposed ends of the foam layer and outer layer are then sealed with the elastomer to prevent fluid from entering the layers. The thus assembled roller is cured at room temperature. Finally, the outer layer of roller is ground to obtain a layer 13 of the required specifications of thickness, smoothness and roundness.

The preferred core 11 is a conventional steel roller core. However, the core may be of other materials, such as fiberglass, provided they possess the required rigidity and other functional properties for use as the core of a printing roller.

The preferred intermediate foam layer 12 is a closed cell polyvinyl chloride/nitrile rubber sponge having a compressibility of about 16 to 28 PSI as measured by ASTM D1056. It can be purchased from the Rubatex Corp. in tubular form under the product designation R 1843H2 SBE.42.

In addition to the preferred foam, any other type of foam material can be used which possesses the desired compressibility and resistance to the solvents and the chemicals which might reach the intermediate foam layer under conditions of use.

The adhesive used to glue the foam layer 12 to the core 11 can be any adhesive suitable for that purpose. When the foam is polyvinyl chloride/nitrile rubber and the core is steel the preferred adhesive is the epoxy R1003/H5002 which can be obtained from Epic Resins Inc.

The preferred elastomer for forming the seal 14 is a room temperature vulcanizing polyurethane which has a viscosity of about 1000–2000 centipoise which permits it to enter the exposed pores of the foam layer 12. The elastomer hardens and ceases to flow within 1½ to 5 minutes depending upon the temperature of the materials used (100–150° F.) and it forms a strong mechanical bond between the seal 14 and the foam layer 12 (best seen in FIG. 3.). The seal 14 which remains chemically tacky prevents gas from escaping from the foam layer and entering the outer or print layer where it can cause undesirable and unacceptable voids.

The preferred elastomer for forming the seal 14 is a polyurethane that can be prepared from a hydroxyl terminated polyester resin comprising 100 parts of a blend of 2000 MW linear polyester diol, about 3.0 parts of a trifunctional crosslinker (such as trimethylol propane) and about 52.5 parts of an isocyanate of the diphenylmethyl diisocyanate type. It also contains a catalyst (e.g. about 0.04 to 0.06 parts of an organometallic or amine catalyst) and stabilizer and color additives.

The elastomer for forming the outer or print layer 13 is one which is "compatible" with the elastomer of the seal 14. In this context "compatible" means that the elastomer of the outer layer will form a satisfactory bond, mechanical and/or chemical, with the cured chemically tacky seal 14. Especially preferred is the same liquid room temperature vulcanizing polyurethane used for the seal 14. When used to form a print layer 13 of about 0.030 to about 0.090 inches thick (preferably about 0.060 inches) and seal 14 and fully cured, the preferred elastomer has a durometer of about 50 to about 70 Shore A (preferably about 60–65) as measured by ASTM 2240. Other urethanes and elastomers having the desired properties and resulting in a print layer 13 having a durometer of about 30 Shore A to about 80 Shore A can be used providing they are compatible with the seal elastomer.

The practice of the invention is further illustrated by the Examples which follow:

EXAMPLE 1

Application of Foam Layer to Core

A core body of rigid steel about 50" in length is cleaned of all grease, oil and foreign material.

A closed cell PVC/nitrile foam tube which has been cleaned on the inside with methyethylketone is then bonded to the core body using an epoxy adhesive (Epic Resin R1003/H5002). The epoxy adhesive is applied to both the core body and the inner diameter of the foam tube. The foam tube which has a thickness of about 0.875" is then expanded using air pressure and slid over the core body.

The assembly is wrapped with nylon tape that is 2 inches in width. The tape is wrapped around the roll from one end to the other. This is done to ensure that all air has been removed from between the core body and the inner diameter of the foam tube. The epoxy adhesive is then allowed to cure at room temperature for a minimum of 8 hours. Once the adhesive is cured, the wrapping tape is removed, and the assembly is placed in an oven at 100–200° F. for about 2 hours to stress relieve the foam. Once the foam is stress relieved, the core/foam assembly is placed into a grinder and the foam is then ground to 0.005"–0.200" under the desired finished size of the finished roller.

EXAMPLE 2

Preparation of RTV Urethane for Seal and Outer Layer

A polyurethane resin mixture containing 100 parts of a polyester masterbatch which is a blend of OH-terminated polyols and crosslinkers, a hydrolytic stabilizer and a pigment, is reacted with a blended diphenylmethane diisocyanate, and catalyzed with an amine or organometallic catalyst.

The preferred material for the seal and the outer or print layer is comprised of 100 parts of a 2000 MW diethylene glycol adipate resin (available under the names Formrez 11-55 from Witco Corporation, Rucoflex (S1011-55 from RUCO Polymer Corporation, and others), 3.5 parts of a trifunctional crosslinker, more particularly TMP (trimethylolpropane). 1.25 parts of a hydrolytic stabilizer (available from Miles, Inc. as Stabaxol 1), 0.25 parts of a pigment, and 0.0625-0.075 parts of an amine catalyst (available from Air Products as Dabco DC2). This blend is then reacted with a stoichiometric amount (about 50-62 parts) of an isocyanate adduct prepared from 100 parts of the same 2000 MW diethylene glycol adipate resin and 105-150 parts of pure or modified diphenylmethane diisocyanate (available as Mondur M from Miles, Inc., Isonate 2181 from Dow Chemical, or preferentially ISO 227 from BASF Corporation). The complete mixture has a viscosity of 1000-2000 centipoise, and hardens and ceases to flow in 1½-5 minutes at 100-150F.

It will be apparent to those skilled in the art that a wide variety of polyester resins, tri-functional crosslinkers, and diphenylmethane diisocyanate types or other isocyanate sources can be utilized without departing from the basic nature of the covering.

EXAMPLE 3

Application of Seal and Outer or Print Layer

The undersized roller (core and foam tube assembly) from Example 1 is coated with a seal coating of the polyurethane resin of Example 2 (mixed immediately before application) by rotating the roller at 3-35 RPM about a center line axis of the core and applying the urethane to the foam using a mix metering machine 15 of the type seen in FIGS. 4 and 5. The seal coating is applied first and allowed to penetrate and cure for 7 minutes to form the seal 14 which is mechanically bound to the foam. The outer or print layer 13 is then applied over the seal 14 while the seal 14 is still chemically tacky (i.e., it still has reactive sites that will be bound to the urethane that forms the layer 13). The same polyurethane resin and mix metering machine are employed. The polyurethane resin is applied while the dispensing head 16 traverses across the axis of the roller while the roller is rotating. The traverse of the machine is usually 25-75% of the liquid polyurethane stream coming out of the machine. (Example: stream width: 0.100" machine traverse: 0.025"-0.075")

Because the core/foam/seal assembly is rotating while the mix metering machine is traversing down the axis, a homogenous outer coating is formed. The outer coating is cured by allowing the roller to sit at room temperature for up to seven days (oven curing can be used, if desired, to speed up the curing time). The cured outer coating is then ground to obtain a layer 13 of the proper specifications.

The compressible roller of the present invention is especially useful as a printing roller. However, because of its light weight and ability to absorb shocks, it also can be used in place of other ink mover or distributor rolls in printing systems.

It will be apparent to those skilled in the art that a number of changes can be made without departing from the spirit and scope of the present invention. Therefore, it is intended that the invention be only limited by the claims.

We claim:

1. A method of making a compressible roller comprises selecting a rigid roller core; gluing with an adhesive a foam layer about the core to form a foam and core assembly; wrapping a tape about the core and foam assembly to compress the foam and curing the adhesive to bond the core and the foam layer together; removing tape and grinding the foam layer to the desired dimensions; forming an elastomeric seal on the outer surface of the foam layer to prevent any gas contained therein from exiting; applying a coating of a compatible elastomer over the seal while rotating the core and foam assembly to obtain an outer coating of a desired thickness; curing the outer coating; and, then grinding the outer coating to obtain an outer layer of a desired smoothness.

2. The method of claim 1 in which exposed ends of the roller are sealed with an elastomer.

3. A method of preparing a compressible printing roller, said method comprising:
    (a) gluing a layer of compressible foam to a rigid printing roller core with an adhesive;
    (b) curing the adhesive;
    (c) grinding the foam layer to a desired roundness and smoothness;
    (d) sealing the outer surface of the foam layer with a room temperature vulcanizing urethane which enters into exposed pores of the foam;
    (e) curing the urethane to form a seal which is mechanically bonded to and which prevents gas from leaving the compressible foam layer;
    (f) applying a coating of a room temperature vulcanizing urethane which is compatible with and forms a chemical bond with the seal over the seal until an outer coating of a desired thickness is obtained;
    (g) allowing the outer coating to completely cure; and,
    (h) grinding away the excess thickness of the outer coating to obtain a print layer of desired properties.

4. The method of claim 3 in which exposed ends of the compressible foam layer and the outer coatings are sealed.

* * * * *